April 22, 1930.    R. K. MERRILL ET AL    1,755,997
SEAT STRUCTURE
Filed July 23, 1928

INVENTORS:
Ralph K. Merrill
Fred J. Blakslee
BY Cyrus W. Rice
ATTORNEY.

Witness:

Patented Apr. 22, 1930

1,755,997

UNITED STATES PATENT OFFICE

RALPH K. MERRILL, OF GRAND RAPIDS, AND FRED J. BLAKSLEE, OF WYOMING TOWNSHIP, KENT COUNTY, MICHIGAN, ASSIGNORS TO AMERICAN SEATING COMPANY, OF GRAND RAPIDS, MICHIGAN, A CORPORATION OF NEW JERSEY

SEAT STRUCTURE

Application filed July 23, 1928. Serial No. 294,638.

The present invention relates to seat structures, particularly such as are installed in theatres and the like and have seats which are swingable to and from a horizontal or usable position; and its object is to provide improved means for swinging such seats when unoccupied to a vertical position of non-use.

This object is attained by, and the invention finds preferable embodiment in, the structure hereinafter particularly described in the body of this specification and illustrated by the following drawings, in which:—

In such auditoriums as theatres and the like, the seat structures are frequently provided with seats which, when unoccupied, may be swung upwardly to permit the ready and unobstructed movement of the audience between the rows of the seat structures. The present invention has for its object the provision of improved means acting automatically to swing the seats upwardly when unoccupied.

Figure 1:
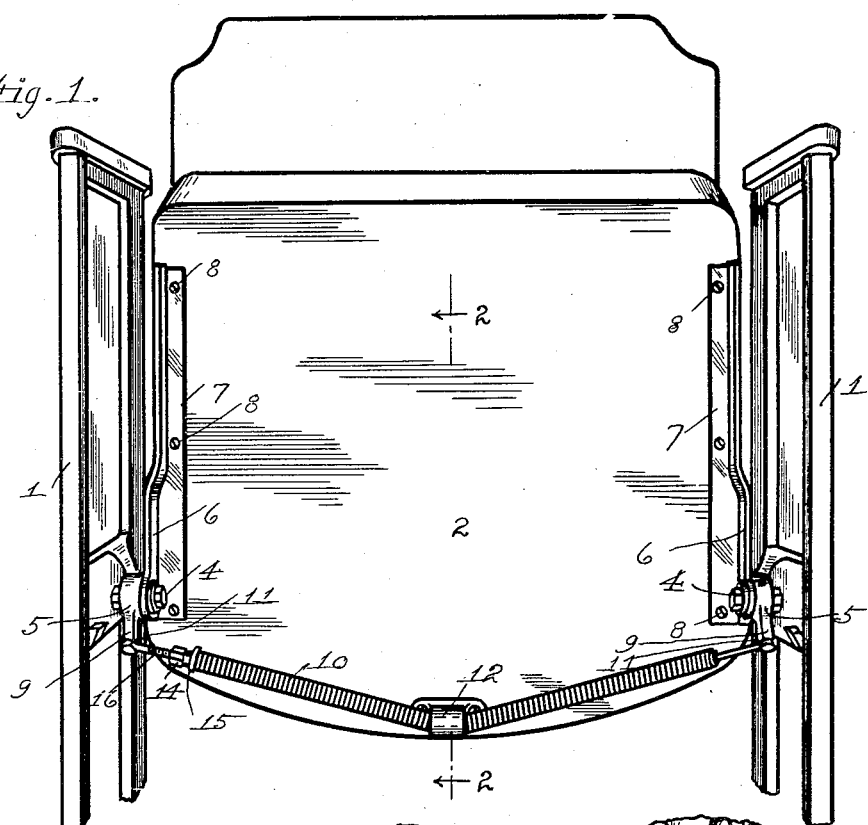
Figure 1 is a front view of a seat structure.
Figure 2:
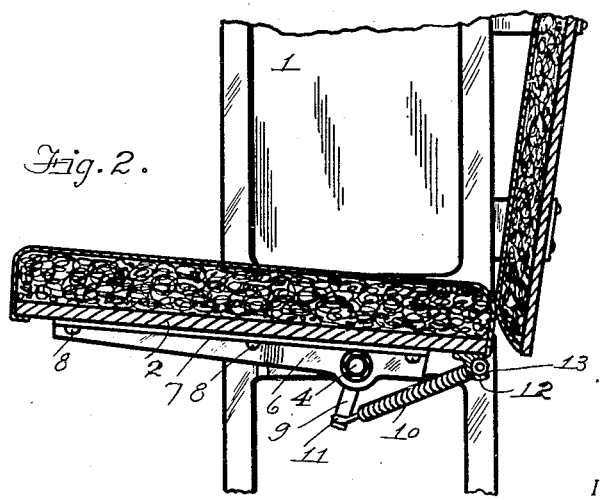
Figure 2 is a sectional view thereof taken on line 2—2 of Figure 1.

The seat structure shown by said drawings includes a support comprising a pair of spaced upright members or "seat ends" 1, and a seat 2 mounted therebetween swingably about a horizontal axis, the pivot bolts 4, passing through the brackets 5 formed on the members 1 and through the downwardly extending flanges 6 of the metallic strips 7 fastened as by screws 8 to the under side of the seat 2. The seat may thus be swung to horizontal or usable position seen in Figure 2 and oppositely to the vertical position of non-use shown in Figure 1. These brackets 5 have arms 9 extending downwardly below said horizontal axis, to which arms respectively are secured the ends of a coiled spring 10, said ends having eyes 11 receiving the ends of said arms. This spring 10 is attached at its middle to the under side of the seat rearwardly from said axis, i. e. adjacent the rear edge of the seat. The spring is thus attached as by means of the clip or hook member 12 as particularly well seen in Figure 2. This clip member's recess 13 receiving the spring may embrace or contact this coiled spring so tightly as to hold the same against axial or endwise movement therein, or the spring may be so securely attached by any other means to the seat in such manner as to hold it against axial movement at the point of such attachment, in which case that portion of the spring which extends to one of the members or seat ends 1 might be dispensed with; preferably, however, the spring is so loose in the recess 13 as to permit it to slide or move axially therein, in which case the tension of the spring at the opposite sides of the member 12 may be automatically equalized. A nut 14 turnable on the end member 15 of the spring and threaded on the spring's extension piece 16 may be turned to adjust the tension of the spring.

This invention being intended to be pointed out in the claims, is not to be limited to or by details of construction of any particular embodiment thereof illustrated by the drawings or hereinbefore described.

What is claimed is:

1. In a seat structure of the character described: a support comprising laterally spaced members; a seat mounted thereon swingably about a horizontal axis to and from usable position; a spring urging the seat from usable position and extending between attached positions on said members below said axis, the spring being axially-movably attached in its middle on the seat at a position rearwardly offset from said axis.

2. In a seat structure of the character described: a support comprising laterally spaced members; a seat mounted thereon swingably about a horizontal axis to and from usable position; a coiled spring urging the seat from usable position and having its ends attached to said members respectively below said axis and its middle axially-movably attached on the under side of the seat at a position rearwardly offset from said axis.

In testimony whereof we have hereunto set our hands at Grand Rapids, Michigan, this 19th day of July, 1928.

RALPH K. MERRILL.
FRED J. BLAKSLEE.